United States Patent
Vallespi et al.

(10) Patent No.: US 10,685,479 B2
(45) Date of Patent: *Jun. 16, 2020

(54) RECONSTRUCTION OF OBJECT SURFACES FROM A POINT CLOUD BY EMPLOYING REGIONAL LEVEL SETS

(71) Applicant: Adobe Inc., San Jose, CA (US)

(72) Inventors: Jose Ignacio Echevarria Vallespi, Saragossa (ES); Byungmoon Kim, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/200,400

(22) Filed: Nov. 26, 2018

(65) Prior Publication Data

US 2019/0096124 A1    Mar. 28, 2019

Related U.S. Application Data

(63) Continuation of application No. 15/334,155, filed on Oct. 25, 2016, now Pat. No. 10,169,912.

(51) Int. Cl.
*G06T 17/00*    (2006.01)
*G06T 7/11*    (2017.01)

(52) U.S. Cl.
CPC ............... *G06T 17/00* (2013.01); *G06T 7/11* (2017.01); *G06T 2200/08* (2013.01); *G06T 2207/10028* (2013.01); *G06T 2210/56* (2013.01)

(58) Field of Classification Search
CPC ......... G06T 15/00–87; G06T 17/00–30; G06T 19/00–20
See application file for complete search history.

(56) References Cited

U.S. PATENT DOCUMENTS

2004/0170302 A1    9/2004 Museth et al.
2013/0262052 A1    10/2013 Mallet et al.
(Continued)

OTHER PUBLICATIONS

Yamazaki, Shuntaro, Kiwamu Kase, and Katsushi Ikeuchi. "Non-manifold implicit surfaces based on discontinuous implicitization and polygonization." Geometric Modeling and Processing, 2002. Proceedings. IEEE, 2002 (Year: 2002).*
(Continued)

*Primary Examiner* — Daniel F Hajnik
(74) *Attorney, Agent, or Firm* — Shook, Hardy & Bacon, L.L.P.

(57) ABSTRACT

Methods and systems for reconstructing surfaces of an object using regional level sets (RLS) are disclosed. A scanning system scans an object and generates a point cloud. An RLS is iteratively determined as solution to a differential equation constrained by the point cloud. The RLS is a 2-tuple, where the first component corresponds to a region identification and the second component corresponds to the solution of the differential equation. The space around the point cloud is iteratively segmented into a plurality of regions. A single solution to the differential equation is applied, encompassing all the regions. The solution in regions of the space corresponding to the finer structures within the point cloud are modeled similar to the coarser regions. The solution in a particular region is iteratively based on the solution in the neighboring regions. An RLS is enabled to reconstruct thinner or smaller structures or surfaces of the object.

20 Claims, 9 Drawing Sheets

(56) References Cited

U.S. PATENT DOCUMENTS

2014/0172377 A1    6/2014    Taubin et al.
2016/0275674 A1    9/2016    Rivet-Sabourin et al.

OTHER PUBLICATIONS

Video "Moedls—Mobile 3d Laser Scanner—Entry in Engadget's Insert Coin competition!", CadabraLabs Published on Feb. 20, 2013; https://www.youtube.com/watch?v=RVgyyllQydg; select screenshots included. (Year: 2013).*

Kazhdan, Michael, et al. "Poisson surface reconstruction." Proceedings of the fourth Eurographics symposium on Geometry processing (SGP '06). Eurographics Association, Aire-la-Ville, Switzerland, Switzerland, 61-70.

Kazhdan, Michael, and Hugues Hoppe. "Screened Poisson surface reconstruction." ACM Transactions on Graphics (TOG) 32.3 (2013): 29.

Lorensen, William E., and Harvey E. Cline. "Marching cubes: A high resolution 30 surface construction algorithm." ACM siggraph computer graphics. vol. 21. No. 4. ACM, 1987.

Zheng, Wen, Jun-Hai Yang, and Jean-Claude Paul. "Simulation of bubbles." Graphical Models 71.6 (2009): 229-239.

* cited by examiner

RECONSTRUCTION OF OBJECT SURFACES FROM A POINT CLOUD BY EMPLOYING REGIONAL LEVEL SETS

CROSS-REFERENCE TO RELATED APPLICATIONS

This application is a Continuation of U.S. patent application Ser. No. 15/334,155 filed Oct. 25, 2016 and entitled "Reconstruction Of Object Surfaces From A Point Cloud By Employing Regional Level Sets," the entire contents of which are hereby incorporated by reference.

BACKGROUND

Scientists, engineers, developers, and artists employ various scanners and/or imagers to analyze, acquire, or reconstruct virtual representations of surfaces of tangible or physical objects. In practice, scanners detect only a finite subset of the surface of objects. As such, scanners typically provide a discretized model of the object. For instance, three-dimensional (3D) scanners and imagers acquire a discretized "point cloud" of data. The point cloud includes a finite set of spatial coordinates, each of which corresponds to a unique physical location on the various surfaces of the scanned object. To provide practical visualization, manipulation, or further analysis of the object, each of the various surfaces must be reconstructed from the discretized point cloud, e.g. a continuous 3D surface of the object must be inferred between the points of the point cloud.

Many of the currently available methods for reconstructing surfaces fail to reconstruct surfaces of thin objects (e.g., thin regions or structures of an object). For instance, some conventional methods include generating a mathematical model from the point cloud, where, at a particular point, the sign (i.e. whether a value of the model that is associated with the particular point is positive or negative) of the model indicates whether the particular point is within or outside of the model. These methods may fail when the sign of the model oscillates over a small region of space.

SUMMARY

Embodiments of the present invention are directed towards generating scanning data of a scanned object and reconstructing surfaces of a scanned object based on the scanning data. Reconstructing of the surfaces includes employing the scanning data is to generate data structures that correspond to a subset of the locations of the object's surfaces. For instance, the data structures may include points of a point cloud. An object model is generated based on the data structures. The surfaces are reconstructed via the object model. The object model includes a Regional Level Set (RLS). In at least one embodiment, the object model is the RLS. An RLS segments a space, which includes the data structures, into a plurality of regions. The space may be discretized, e.g. a grid is imposed on the space such that the space includes a plurality of nodes. For each of the nodes, the object model can include a region identification (ID) that corresponds to exactly one of the segmented regions. That is, each node is assigned to one of the segmented regions of the space. The region ID for a node indicates to which region a node is assigned.

Furthermore, the object model can include an indicator value for each of the nodes. The indicator value corresponds to a value of an indicator function of the RLS. The indicator value associated with the node may be the value of the indicator function at the node. The indicator function of the RLS is a solution to an equation constrained by the data structures. In some embodiments, the indicator function is an explicit model for each of the plurality of segmented regions. Thus, the indicator value for each of the nodes is based on the region ID and the data structures. In some embodiments, each of the indicator values is of the same signed value, that is, either all of the indicator values are non-negative or all of the indicator values of the model are non-positive.

In some embodiments, both of the indicator values and the region IDs for each of the nodes are iteratively updated based on the indicator values and the region IDS of neighboring nodes. The iterations continue until one or more convergence conditions are satisfied. A convergence condition may be based on a comparison, or difference, of the corresponding indicator values and the regions IDs of successive iterations of the RLS, as well as one or more convergence thresholds. In some embodiments, the space includes only a single region. However, during the iterations of the object model, a plurality of additional regions can be generated. Furthermore, individual or combinations of regions may subdivide, segment, and/or merge throughout the iterative updating of the object model.

DETAILED DESCRIPTION

Figure 1:
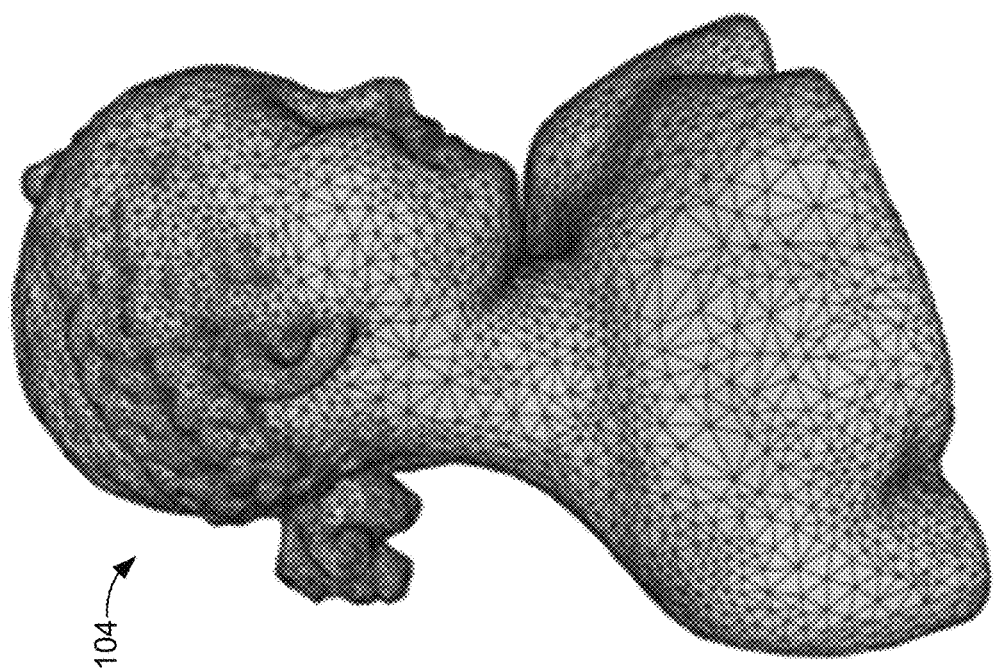
FIG. 1 illustrates a two-dimensional visualization of a three-dimensional point cloud and a reconstructed surface, where the reconstruction was performed via methods consistent with the various embodiments presented herein.
Figure 1:
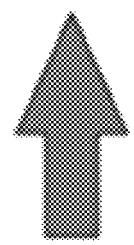
Figure 1:
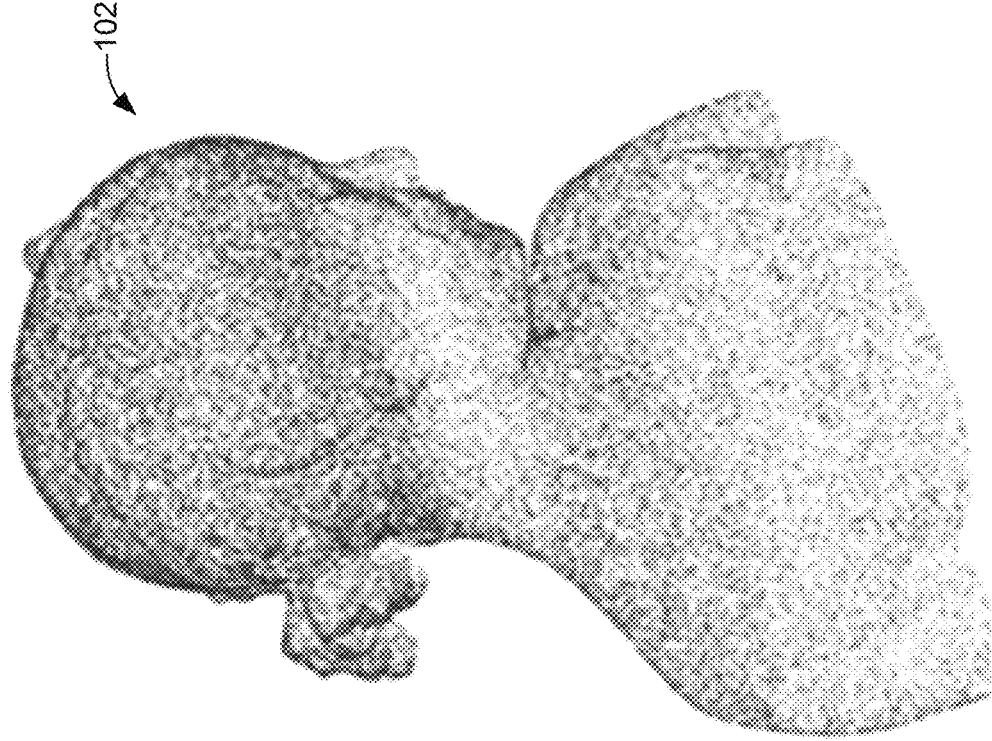

Three-dimensional scanning systems generally generate point clouds based on the scanning of objects. To provide a visualization or analysis of an object, the surfaces of the object must be reconstructed from the discretized point cloud. That is to say, a continuous 3D surface of the object must be inferred between the discrete points of the point cloud. Various embodiments described herein employ a regional level set (RLS) to segment the space of the point cloud into a plurality of regions. The RLS explicitly models the scanned object in each of the plurality of regions to reconstruct the surfaces of the object from the point cloud. Conventional methods may fail when reconstructing some surface types. In particular, and as discussed below, these conventional methods do not adequately resolve thin surfaces of structures of the scanned object. In contrast to the conventional/existing methods, the More particularly, conventional methods for reconstructing surfaces of scanned objects involved numerically solving a partial differential equation (PDE) using a signed level set function (SLS) method. An SLS method segments the space or geometric domain, which includes the point cloud, into only two regions. Typically, the sign of the level set is employed to segment the space into two specific regions, or "binary regions." As used herein, the sign of a level set, as well as other functions, may refer to whether the value of the level set (or other function) is positive (i.e. greater than zero) or negative (i.e. less than zero). The binary regions are: (a) within the object and (b) outside the object. Regions of the space where the value of the SLS is positive are assumed to be within the object, while the regions where the value of the SLS is negative are assumed to be outside the object. The reconstructed surface includes the boundary between the two regions. Thus, the surfaces of the object are assumed as the subset of regions of the space where the SLS transitions from a positive to a negative value.

However, numerical difficulties arise when estimating the SLS in regions of the point cloud that correspond to "thin" structures of the object. For instance, an SLS may fail to resolve opposing surfaces of the object when the distance between opposing surfaces of the "thin" region is less than a distance threshold. For adequately reconstructed opposing surfaces, the solution of the PDE transitions from a negative value to a positive value (at the first opposing surface) and back to a negative value (at the second opposing surface). Thus, when the physical dimensions of the object's structures, i.e. the distance between opposing surfaces, are on the order of, or smaller than, the granularity of the grid employed to numerically solve the PDE, the numerical estimation of the SLS will not resolve such "back-to-back" transitions. Accordingly, the estimate of the SLS is not precise enough to model the negative-to-positive and the positive-to-negative transitions, corresponding to the "thin" structures of the object. Rather, when "back-to-back" transitions of the SLS would occur between neighboring grid nodes, the traditional numerical methods do not adequately model the transitions. Accordingly, the "thin" structures of an object may not be adequately reconstructed by solving the PDE via an SLS.

The various embodiments described herein advantageously utilize/use a regional level set (RLS) method to iteratively determine solutions to the PDE. Although, RLS is an existing mathematical framework, it has not been previously applied to Poisson's equation to reconstruct the surfaces of a scanned object. In contrast to an SLS method, an RLS method models an unbounded number of different regions of the space explicitly. Essentially, the various embodiments iteratively segment the space into a plurality of regions, where a single solution to the PDE takes into account all the regions. Thus, the solution in regions of the space corresponding to the finer structures within the point cloud are determined along the coarser regions Accordingly, the solution for a particular region is iteratively based on the solutions for at least the neighboring regions. Thus, an iteratively generated RLS is enabled to reconstruct thinner structures or surfaces of the object, where an SLS may not due to the numerical difficulties discussed above.

Various embodiments of an RLS include a 2-tuple, where the first component corresponds to a region identification (ID), and the second component corresponds to the numerical estimation of the solution of the PDE, subject to the point cloud and the solution for the neighboring regions. However, in contrast to an SLS, the numerical estimation of the solution to the PDE is constrained to be non-negative. That is, for the various embodiments of an RLS discussed herein, a transition from a positive value to a negative value is not employed to segment the space into only two regions, as is the case of the SLS method. Rather, the boundaries between neighboring regions occur where the estimation of the solution to the PDE approaches 0.0 and there is a variance in the region ID for neighboring regions or grid nodes. Thus, the various embodiments discussed herein are not subject to such numerical difficulties when reconstructing small or thin surfaces of features of an object via the point cloud.

It should be noted that at least a portion of the various embodiments are directed to determining solutions PDE over a space, where the PDE is constrained by the point cloud. Thus, when discussing generating a solution, it should be understood, that at least for some embodiments, the solution is an approximation or estimation of the solution of the PDE. However, other embodiments are not so constrained, and at least for one embodiment, an exact solution may be generated.

FIG. 1 illustrates a two-dimensional visualization of a point cloud 102 and a reconstructed surface 104, where the reconstruction was performed via methods consistent with the various embodiments presented herein. Point cloud 102 may have been generated via any of the various embodiments discussed herein. For instance, a three-dimensional (3D) scanner may have scanned a 3D sculpture or bust. As such, point cloud 102 includes a plurality of structured and/or unstructured 3D data.

For instance, point cloud 102 may include a plurality of data structures, each of which includes, or is at least associated with, one or more spatial coordinates of regions of the surfaces of the object. Thus, point cloud 102 may include a plurality of "data points," or simply "points." A data point may include one or more spatial coordinates, such as but not limited to Cartesian coordinates. In one embodiment, point cloud 102 may include M data points, where $M \in \mathbb{N}$. Each of the data points in point cloud 102 may be represented by $(x_i, y_i, z_i)$, where $i \in \mathbb{N}$, $i \leq M$, and $(x_i, y_i, z_i) \in \mathbb{R}$. The various embodiments discussed herein employ point cloud 102 and one or more RLS to reconstruct a surface 104 and provide an object model and/or an object model for the scanned model.

Example Operating Environment

Figure 2:
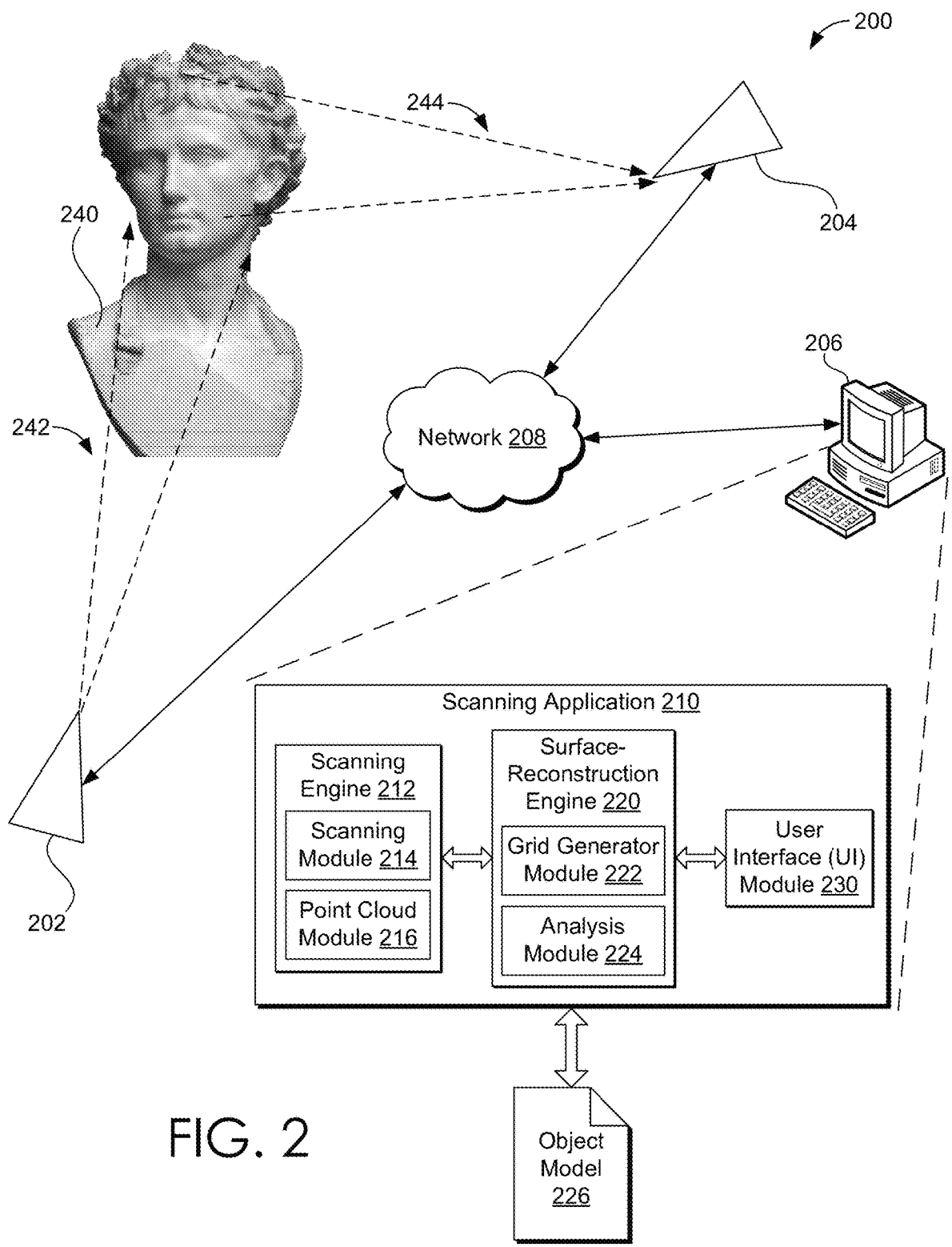
FIG. 2 depicts a system implementing various embodiments presented herein.

FIG. 2 depicts a system 200 implementing various embodiments presented herein. As discussed throughout, various embodiments are directed to methods and systems for reconstructing surfaces of an object by employing a regional level sets (RLS). A system, such as but not limited to system 200, is employed to scan an object, such as but not limited to object 240, and generate a point cloud, such as but not limited to point cloud 102 of FIG. 1. The surfaces of the object are reconstructed by generating solutions to one or more partial differential equations (PDEs) within a space that includes the point cloud. The points of the point cloud provide constraints for the PDE. For instance, the PDE may include a source term that is based on the point cloud. In at least one embodiment, the PDE may include Poisson's equation. The source term of Poisson's equation may be a scalar field based on the point cloud. An RLS segments the space around the point cloud into a plurality of regions. The number of regions is unbounded.

In various, but non-limiting, embodiments, system 200 is a scanning and/or imaging system. System 200 includes a photon transmitter 202, a corresponding photon receiver 204, and a computer device 206. An exemplary, but non-limiting embodiment of a computer device is discussed in conjunction with computing device 900 of FIG. 9. Computer device 206 hosts a scanning application 210. In an exemplary, but non-limiting embodiment, scanning application 210 includes a scanning engine 212, a surface-reconstruction engine 220, and a user interface (UI) module 230. In various embodiments, system 200 is a 3D scanning system, although other embodiments are not so constrained and system 200 may include 1D or 2D scanning capabilities. In some embodiments, the surface-reconstruction engine 220 is a separate engine from the scanning engine 212 or scanning application 210. For example, the surface-reconstruction engine 220 is not included in the scanning application 210, but may be included in another application, such as but not limited to a surface-reconstruction application.

System 200 includes a generalized communication network 208. Network 208 communicatively couples each of photon transmitter 202, photon receiver 204, and computer device 206. Network 208 may be any communication network, including virtually any wired and/or wireless communication technologies, wired and/or wireless communication protocols, and the like. In various embodiments, network 208 includes a combination of wireless and wired communication technologies. It should be understood that network 208 may be virtually any network that communicatively couples each of photon transmitter 202, photon receiver 204, and computer device 206.

In some embodiments, photon transmitter 202, photon receiver 204, and computer device 206 are integrated into one or more sub-systems. For instance, photon transmitter 202, photon receiver 204, and computer device 206 may be integrated into a single unit that is not required to employ network 208.

A user of computer device 206 may employ one or more UIs provided via UI module 230 and network 208 to control the scanning process, as well as a surface reconstruction process. UI module 230 may provide and/or receive data, commands, instructions, or the like from each of scanning engine 212 and surface-reconstruction engine 220. Various embodiments of the scanning engine 212 may include a scanning module 214 and a point cloud module 216.

The scanning module 214 may control, coordinate, or otherwise enable the scanning process. During the scanning process, photon transmitter 202 transmits one or more outgoing photon beams 242 towards the object 240 to be scanned. Object 240 reflects or scatters the outgoing beam 242. At least a portion of the reflected beam is reflected towards the photon receiver 204. The photon receiver 204 receives and/or detects one or more incoming photon beams 244 that the surfaces of object 240 reflects.

Photon receiver 204 provides data associated with detecting the one or more incoming photon beams 244 to the scanning application 210, via network 208. The point cloud module 216 may generate a point cloud based on the data associated with the one or more incoming photon beams 244.

As used herein, a point cloud may include a plurality of data structures, each of which includes, or is at least associated with, one or more spatial coordinates of regions of the surfaces of the object. Thus, point cloud may include a plurality of "data points," or simply "points" that are data structures. In other embodiments, the point cloud includes unstructured data corresponding to spatial points. A structured data point may include one or more spatial coordinates, such as but not limited to Cartesian coordinates. In one embodiment, a point cloud may include M data points, where $M \in \mathbb{N}$. Each of the data points in point cloud may be represented by $(x_i, y_i, z_i)$, where $i \in \mathbb{N}$, $i \leq M$, and $(x_i, y_i, z_i) \in \mathbb{R}$. In some embodiments, a point cloud is a data cloud of point-like structured and/or unstructured data. Although various embodiments of generating a point cloud discussed herein involve scanning an object, a point cloud may be generated via virtually any number of mechanisms.

As described in the various embodiments herein, the surface-reconstruction engine 220 reconstructs the surfaces of object 240. The scanning engine 212 provides the generated point cloud to the surface-reconstruction engine 220. Various embodiments of the surface reconstruction engine 220 include a grid generator module 222 and an analysis module 224. The grid generator module 222 generally generates a grid within a space that includes the point cloud. Generally, the analysis module 224 may at least partially reconstruct the surfaces of object by, for example, estimating a solution to one or more partial differential equations (PDEs), constrained via the point cloud. For instance, the analysis module 224 may estimate solutions via a regional level set (RLS) as discussed throughout. In some embodiments, an object model 226 is outputted and provided via one or more models. The object model models the object via the reconstructed surfaces. Thus, the object model may include the RLS.

UI module 230 provides one or more UIs to a user of computer device 206. Such UIs provide a visual representation of the point cloud and/or a visual representation of the reconstructed surfaces. For instance, FIG. 1 shows a visual representation of a point cloud 102 and a visual representation of the reconstructed surfaces 104.

Surface Reconstruction with Regional Level Sets (RLS)

Figure 3:
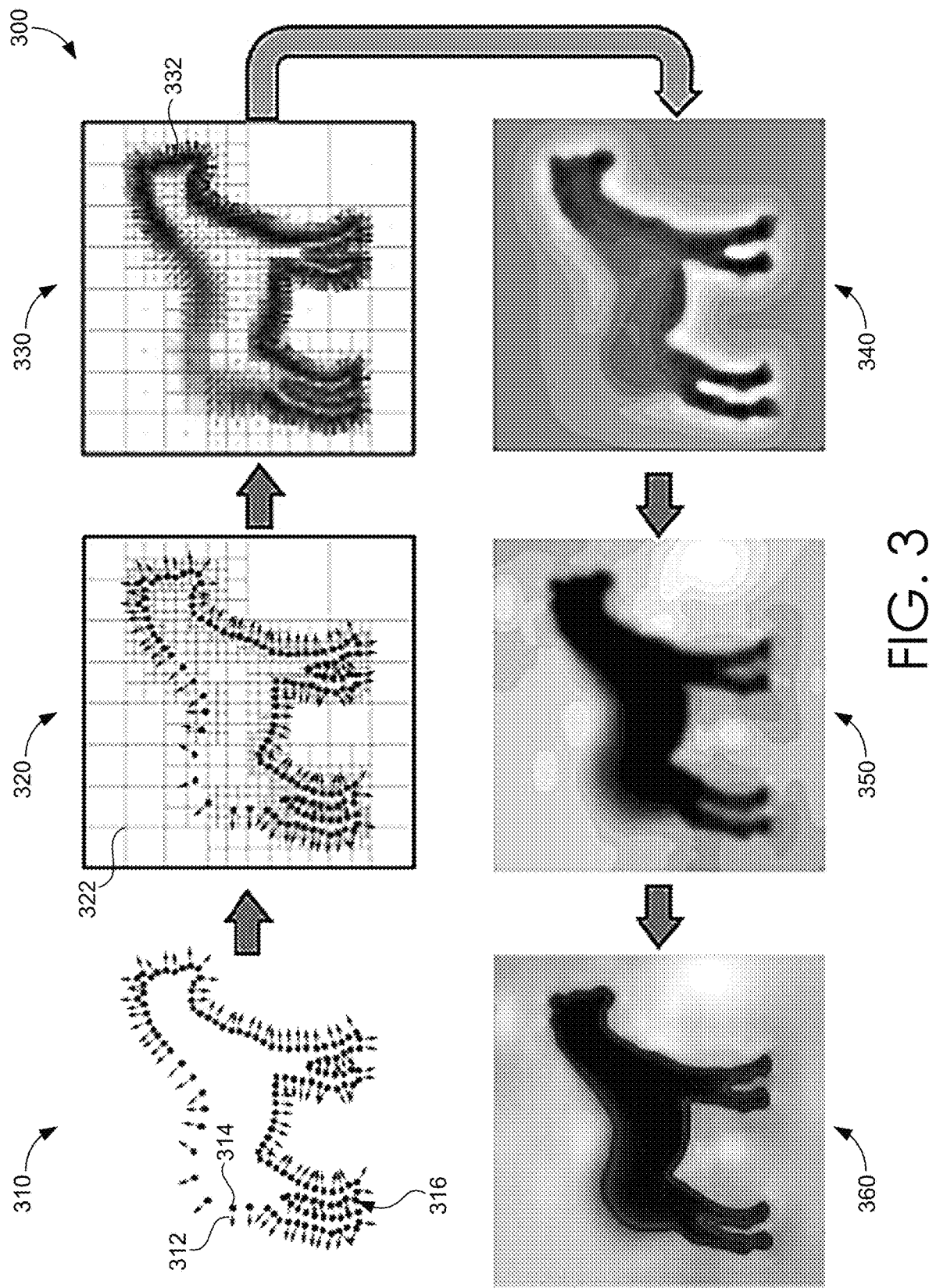
FIG. 3 shows an exemplary, but non-limiting embodiment of a surface-reconstructing workflow that is consistent with the various embodiments presented herein.

FIG. 3 shows an exemplary, but non-limiting embodiment of a surface-reconstructing sequential workflow 300 that is consistent with the various embodiments presented herein. As mentioned above, the surfaces of an object represented via a point cloud are reconstructed by numerically solving one or more PDEs. Regional level sets (RLS) are employed to solve the PDE in the various embodiments. As discussed throughout, an RLS may be represented as the 2-tuple: $\{r, \psi\}$, where $r \in \mathbb{N}$ is a region identification (ID) and $\psi \in \mathfrak{R}^+$. That is to say that $\psi$ is a positive real-valued function. Thus, upon solving the PDE with the RLS over the space, each point within the space (or grid node) is associated with a region (identified by the natural number r) and a non-negative real number (identified by $\psi$). Furthermore, the RLS segments the space into a plurality of regions, each of which is identified by r. The RLS is iteratively explicitly determined for each of the regions.

In various embodiments, the PDE solved by the RLS ($\{r, \psi\}$) to reconstruct the surfaces of a scanned object is Poisson's equation, where the source term (or function) in the equations is provided via the point cloud, as shown in Equation (1).

$$\nabla^2 \{r, \psi\} = \nabla \cdot \vec{n}, \quad (1)$$

where $\vec{n}$ is a vector field that includes a set of normal vectors generated based on the point cloud. In contrast to the traditional signed level set (SLS) version Equation (1), the indicator function ($\psi$) of a region of the RLS is constrained to be a non-negative real number. Thus, the sign of $\psi$ is not employed to segment the space into binary regions: within the object and outside the object. Rather, the space is explicitly segmented into more than two regions using the region ID, determined iteratively from the solution of Equation (1).

Step 310 of workflow 300 shows a 2D point cloud 316. Point cloud 316 includes a plurality of points. One of the points of the plurality of points is indicated as 314. It should be noted that other embodiments are not so constrained, and a point cloud may be a 1D point cloud or a 3D point cloud, such as point cloud 102 of FIG. 1. The set of normal vectors ($\vec{n}$) may be generated based on the point cloud 316 during step 310, or acquired during the scanning process. One vector in the set of normal vectors is indicated as 312. The set of normal vectors may be included in a vector field. As discussed below, workflow 300 includes discretizing the reconstruction of the surfaces. As such, the vector field may be a discretized vector field over a grid that includes a plurality of grid nodes. For each grid node that is not associated with one of the vectors in the set of normal vectors, a vector quantity with a zero magnitude is associated with the node.

In addition to the point cloud, step 310 shows the vector field generated from the point cloud. The point cloud may have been generated by a scanning system, such as but not limited to system 200 of FIG. 2 to scan an object. For instance, a 2D statue of a horse may have been scanned to generate the 2D point cloud shown in step 310.

The various embodiments employ finite element methods (FEMs) and finite element analysis (FEA) to determine a solution to a PDE, such as but not limited to Equation (1) discussed above. As such, a grid is generated over the space that includes the point cloud. The RLS is discretized to the grid nodes. Accordingly, the RLS may include a region ID (r) and an indicator function value ($\psi$) for or associated with each grid node. When determining the RLS ($\{r, \psi\}$) for the constrained PDE, the region ID and the indicator function value are iteratively updated for each of grid nodes. As used herein, a grid is an object that discretizes a geometric domain or space at a plurality of grid nodes. Grids are employed in various FEMs and FEA.

The grid may be generated at step 320. A grid node is shown as 322. The dimensionality of the grid generally matches the dimensionality of the point cloud. Thus, as shown in step 320, the grid is a 2D grid. However, for a workflow that involves 3D point cloud, such as point cloud 102, the generated grid is a 3D grid. As shown in step 320, a uniform grid is not required. Rather, the resolution (or spacing between the nodes) of the grid may vary based on the varying resolution or the spatial locations of the points of the point cloud.

At step 330, a discretized scalar field 332 is generated over the space based on the vector field. In at least one embodiment, the scalar field may be equivalent to the divergence of the vector field ($\nabla \cdot \vec{n}$). The scalar field may be employed to constrain the PDE that is solved. For instance, the scalar filed may be the source term in Equation (1). The discretized scalar field may be determined at each grid node.

Step 330 shows the scalar field over the space. Similar to $\psi$, a value for the scalar field may be determined for each of the grid nodes.

Furthermore at step 330, one or more linear operators may be generated and/or defined. During later steps in work flow 300, the linear operator iteratively operates on $\psi$ to reconstruct the surfaces of the scanned object. In some embodiments, the linear operator is a differential operator, such as but not limited to the Laplace (or Laplacian) operator ($\nabla^2$).

Similar to other FEMs employed to solve PDEs, matrix methods may be employed to determine the solution to the PDE. For instance, in some embodiments, the values for $\psi$ for the nodes may be represented as a vector quantity ($\psi_1, \psi_2, \psi_3, \ldots$) (where the subscript denotes the node index) Likewise, the scalar field values for the nodes may be represented as another vector quantity. The linear operator may be represented as a matrix. The matrix operates on the vector quantity of the indicator function values. For instance, it is understood that Equation (1) can be represented as a system of linear PDEs, as such. Thus, matrix operations may be employed to iteratively determine RLS ($\{r, \psi\}$).

During steps 340 and 350, the RLS is iteratively updated over the space, based on the linear operator and the scalar field. More specifically, the scalar field and the differential linear operator operating on $\{r, \psi\}$ define the PDE to be solved. The PDE is numerically solved over the grid by iteratively updating $\{r, \psi\}$ at each node of the grid. Thus, at step 330, an initial estimation or approximation of $\{r, \psi\}$ may be generated for each node of the grid. The iteration process continues until the updated numerical estimation of the solution satisfies one or more precision requirements, such as but not limited to a one or more convergence conditions or tests.

In various embodiments, the Jacobi iterative method is employed to update an estimation of the RLS until a convergence test is satisfied, i.e. one or more convergence conditions is satisfied or one or more convergence thresholds is exceeded. For instance, an initial estimation or approximation of the RLS may be discretized over the grid. The approximation may be iteratively updated, via a Jacobi matrix (based on the linear operator) and the scalar field (also discretized over the grid) until adequate convergence is achieved. Other embodiments are not so constrained, and other FEMs may be employed to solve the PDE. Virtually any method for determining the RLS, via the PDE may be employed during steps 340 and 350.

Figure 4:
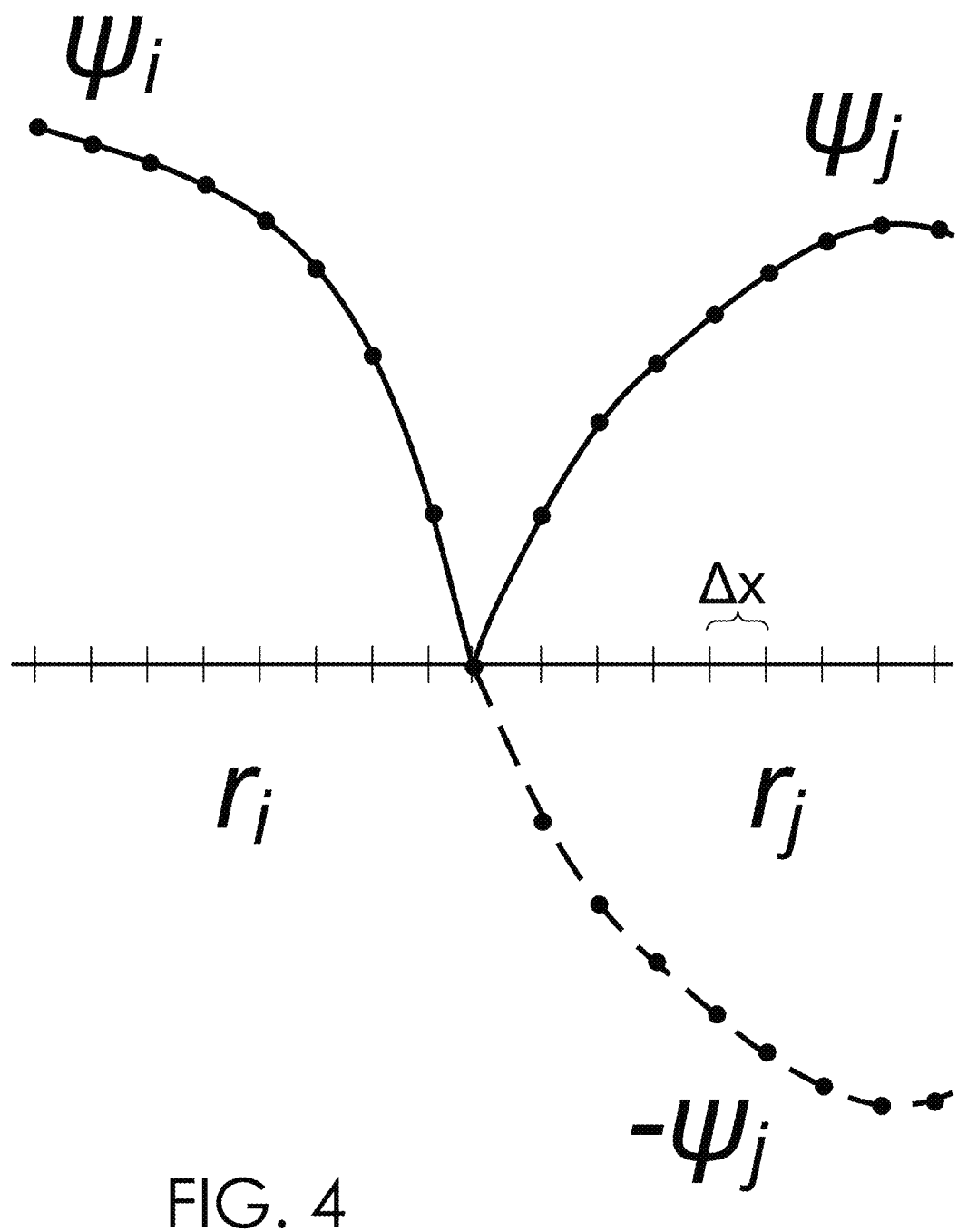
FIG. 4 shows two neighboring regions and illustrates operations across the regions that are consistent with the various embodiments presented herein.

As noted throughout, the RLS segments the space into a plurality of regions. The RLS for the ith node may be represented as $\{r_i, \psi_i\}$. In some embodiments, region based algebraic operations are defined for the RLS. FIG. 4 shows two neighboring regions and illustrates operations across the regions that are consistent with the various embodiments presented herein. For the purposes of clarity and ease of visualization, the embodiments shown in FIG. 4 are 1D embodiment. However, it is understood that 2D and 3D embodiments are similar and may include similar features.

More specifically, FIG. 4 shows a portion of an RLS that segments the 1D space into a plurality of regions. The region ID for the nodes belonging to the region on the left is labeled as $r_i$. Likewise, the region ID for the nodes belong to the region of the right is labeled as $r_j$. The indicator function for the region on the left is represented as $\psi_i$ and the indicator function for the region on the right is represented as $\psi_j$. Note the uniform 1D grid employed to discretize the 1D space. The feature size of the uniform grid is represented by $\Delta x$. However, as discussed above, for other embodiments, the grid may not be uniform, based on the point cloud. Note that, as shown in FIG. 4, the indicator function value for each node is graphically represented as a point. Also shown in FIG. 4, the indicator function may be smoothly interpreted between the nodes.

The boundary between two neighboring regions are contours where $\psi_i \to 0$, $\psi_j \to 0$, $r_i \neq r_j$. It should be noted that the dimensionality of a boundary between the neighboring regions may be one less than the dimensionality of the space. For instance, when the point cloud is a 3D point cloud, the contours defined by $\psi_i \to 0$ and $\psi_j \to 0$ for neighboring regions $r_i$, and $r_j$ is a 2D boundary. As shown in FIG. 4, in 1D space, the boundary between the i-th and the j-th region is the point (dimensionality=0), where $\psi_i \to 0$ and $\psi_j \to 0$.

Because $\psi$ is constrained to be non-negative, region based algebraic operations are defined such that every point of the region $r_i$ "sees" the negative value of $\psi$ from other regions. That is, when iteratively determining the RLS and considering the i-th region, $\psi_j$ is evaluated as $-\psi_j$ for $i \neq j$, as shown by the negative dotted curve in FIG. 4.

Considering that $$\nabla = \frac{d}{dx}$$

for the 1D case of FIG. 4, at a particular node of the grid (included in the i-th region), $\nabla^2 \varphi_i$ may be evaluated as $$\nabla^2 \varphi_i \approx \frac{1}{(\Delta x)^2}\left(\sum_{j \in N(i)} \varphi_j - |N(i)|\varphi_i\right)$$

where N(i) is the subset of grid nodes that are included in the neighborhood of the i-th node and $\Delta x$ is the spatial distance between two neighboring nodes in the x-dimension and $\varphi$ is an indicator function, as in the SLS embodiments. Note that the above approximation may be generalized for two and three dimensions. For instance, |N(i)| depends on the number of dimensions: 1, 2, or 3.

A diagonally dominant Jacobi matrix is generated for such approximations. The Jacobi matrix may be iteratively applied to solve Equation (1). For the 1D embodiment of FIG. 4, a current approximation for the indicator function ($\varphi^n$) may be iteratively updated as ($\varphi^{n+1}$), shown below.

$$\varphi_i^{n+1} = \frac{1}{|N(i)|}\left(\sum_{j \in N(i)} \varphi_j^n - (\Delta x)^2 \nabla \cdot \vec{n}\right)$$

More specifically, Jacobi's method is applied iteratively via the generated matrix employed in Equation (1), as provided above. Equations (2), (3), (4) and (5) below show one embodiment of the explicit update applied to the RLS ({r, $\psi$}) at discussed in conjunction with at least FIG. 4.

$$\varphi_{r_i} = \sum_{j \in N(i)} s_i(r_j, \psi_j), \text{ where} \tag{2}$$

$$s_i = +\psi_j \text{ if } r_j = r_i \tag{3}$$

$$s_i = -\psi_j \text{ if } r_j \neq r_i$$

$$\psi^{n+1} = \frac{|\phi_{r_i}^n + (\Delta x)^2|\nabla \cdot \vec{n}\|}{|N(i)|} \tag{4}$$

In other embodiments, where the PDE is different from Equation (1), Equation (4) may be varied to reflect the linear operator and any scalar field for the particular PDE. In equation (4), the absolute values are employed because the indicator function in RLS is constrained to be non-negative. The region assigned to each grid node is also iteratively updated.

$$r^{n+1} = \xi \text{ if } \nabla \vec{n} \neq 0 \text{ and } \phi_{r_i} = 0 \tag{5}$$

$$r^{n+1} = \begin{array}{c} \text{argmax}(\phi_{r_i}) \\ r_j \in N(i) \end{array} \text{ if } \phi_{r_i} < 0$$

$$r^{n+1} = r^n \text{ else}$$

where $\xi \in \mathbb{N}$ is a random region ID. Equations (2)-(5) are employed to iteratively solve (1). Because an RLS solution is employed, rather than an SLS, the solution of Equation (1) is a single solution that explicitly models each of the regions. Thus, the "thin" regions of the surfaces are properly modeled to be reconstructed with adequate precision.

In various embodiments, the initial estimation or approximation of the RLS may include a single region. That is to say, the region ID (r) associated with the nodes of the grid is the same for each node. For such narrow band embodiments, during the iterations for determining the RLS, additional regions are generated around the point cloud. Regions subdivide, segment, and/or merge, via equation (5), until convergence and/or stabilization is achieved.

In some embodiments, equation (5) may result in nodes oscillating region IDs from iteration to iteration. For instance, because equation (5) is based only on the region IDs of neighboring nodes, neighboring nodes with different region IDS can swap regions during the determination of the RLS. In such embodiments, the convergence tests may not be satisfied, even after a large number of iterations.

Thus, in such embodiments, after the RLS is updated at each iteration, the updated values may be refined, via a relaxation method. Such relaxation methods enable convergence within an acceptable, finite number of iterations. In these embodiments, at each iteration, the RLS may be refined as a blend between the current RLS approximation and the updated approximation (via equations (2)-(5)) based on a relaxation parameter $\alpha$, where $\alpha \in [0,1]$.

$$\psi^{n+1} = (1-\alpha)\psi^n + \alpha\psi^n \tag{6}$$

$$r^{n+1} = r^{n+1} \text{ if } \mu > \alpha$$

$$r^{n+1} = r^n \text{ else} \tag{7}$$

where $\mu \in [0, 1]$ is a random (or pseudo-random) number determined randomly at each iteration. In some embodiments, $\alpha \approx 0.9$.

Referring back to FIG. 3, steps 340 and 350 show two time slices of the evolution of the segmentation of the space into the plurality of regions associated with the RLS. The iteration of steps 340 and 350 may terminate when the one or more convergence conditions are satisfied At step 360, the surface is reconstructed. In some embodiments, a marching cube or a marching square method is employed to reconstruct the surface at step 360. A marching cube method includes a 3D algorithm for extracting a polygonal grid for an isosurface defined via a 3D scalar field, which for the various embodiments includes the indicator function $\psi$ of the RLS. A marching squares method may be the 2D version of a marching cube method. In some embodiments, the surface may be reconstructed by generating the gradient of the RLS, e.g. $\nabla \psi$. The RLS, or the gradient of the RLS may be included in an object model for the object. The reconstructed surface is shown at step 360.

Generalized Processes for Surface Reconstruction with Regional Level Sets (RLS)

Processes 500, 520, 600, and 700 of FIGS. 5A-7 will now be discussed. Briefly, processes 500, 520, 600, and 700, either singly or in combination, may be employed to reconstruct one or more surfaces of an object.

The various embodiments of processes and/or methods, as described in at least conjunction with processes 500, 520, 600, and 700 may be at least partially implemented by one or more scanning or imaging systems, scanning applications, and/or surface reconstruction engines. Thus, processes 500, 520, 600, and 700, or at least portions thereof, may be implemented by one or more of system 200, scanning application 210, and/or surface reconstruction engine 220 of FIG. 2. Furthermore, these processes, or at least portions thereof, may be performed by or executed on virtually any computer device (real or virtual machines) or virtually any combination of computer devices, including but not limited to computer device 206 of system 200 of FIG. 2. Processes may enable at least portions of workflow 300 of FIG. 3.

Figure 5A:
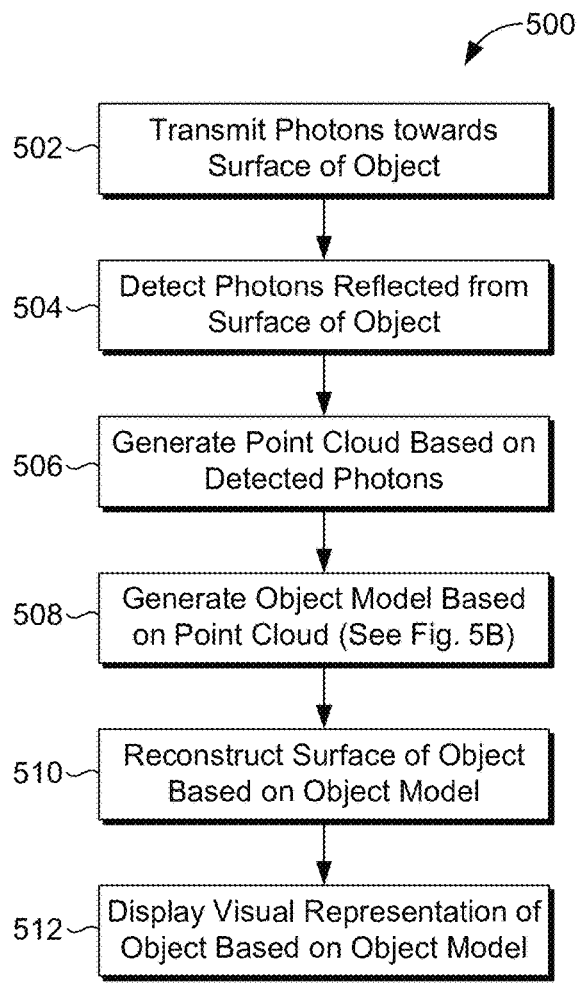
FIG. 5A illustrates one embodiment of a process flow for reconstructing a surface that is consistent with the various embodiments presented herein.

FIG. 5A illustrates one embodiment of a process flow for reconstructing a surface that is consistent with the various embodiments presented herein. Process 500 begins, after a start block, at block 502 where photons are transmitted towards one or more surfaces of an object. For instance, a photon transmitter, such as but not limited to photon transmitter 202 of FIG. 2, transmits one or more outgoing and/or transmitted photon beams towards an object to be scanned. The surfaces of the object reflects or scatters at least a portion of the outgoing beam.

At block 504, at least a portion of the photons reflected from the surface of the object are detected. For example, at least a portion of the reflected beam is reflected towards a photon receiver and/or detector such as but not limited to photon receiver 204 of FIG. 2. The photon receiver receives and/or detects the one or more reflected and/or incoming photon beams.

At block 506, a point cloud is generated based on the detected photons. For instance, a point cloud module, such as point cloud module 216 of FIG. 2, may generate a point cloud based on data associated with the one or more detected reflected photon beams. Exemplary, but non-limiting, embodiments of a point cloud are shown in 3D point cloud 102 of FIG. 1 and the point cloud of workflow 300 of FIG. 3.

As discussed throughout, generating a point cloud may include generating a plurality of data structures based on a detected plurality of photons. The detected photons may have been transmitted toward surfaces of an object and reflected from the surfaces of the object. Each of the data structure corresponds to a location on the surface of the object that reflected the photons. For instance, the plurality of data structures may include a point data structure within a point cloud.

At block 508, an object model is generated based on the point cloud. Various embodiments for generating an object model are discussed in conjunction with at least process 520 of FIG. 5B. However, briefly, a regional level set (RLS) may be iteratively determined based on finite element analysis (FEA) numerical methods applied to solve one or more partial differential equations (PDE) that are constrained by the point cloud. Accordingly, an object model may include an RLS. In various embodiments, a linear operator is generated, as well as a vector field based on the point cloud. A scalar field is generated based on the vector field. An RLS over the space is iteratively updated based on the linear operator and the scalar field. For instance, workflow 300 of FIG. 3 provides at least one workflow embodiment for generating a object model based on the point cloud.

At block 510, the one or more surfaces of the objected are reconstructed. In some embodiments, a marching cube or a marching square method is employed to reconstruct the surface at block 510. For instance, the gradient of the RLS of the object model may be generated and/or determined to reconstruct the surface of the object. Step 360 of workflow 300 shows one non-limiting embodiment of a visualization of a 2D reconstructed surface.

At block 512, a visual representation of the object may be displayed. For instance, a user interface (UI) module of a scanning application may provide a visual representation of the object based on the object model and/or the reconstructed surfaces. For instance, a visual representation of reconstructed surface 104 is shown in FIG. 1. Process 500 may terminate and/or return a calling process.

Figure 5B:
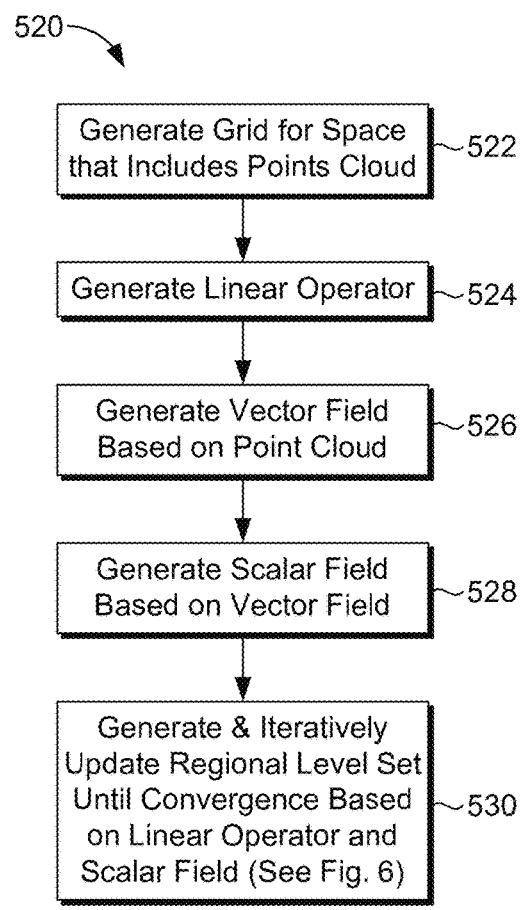
FIG. 5B illustrates one embodiment of a process flow for generating an object model based on a point cloud that is consistent with the various embodiments presented herein.

FIG. 5B illustrates one embodiment of a process flow for generating an object model based on a point cloud that is consistent with the various embodiments presented herein. As discussed throughout, in various embodiments, an object model includes an RLS. After a start block, process 520 begins at block 522, where a grid is generated for the space that includes the point cloud. The dimensionality of the grid matches the dimensionality of the point cloud and the space. In some embodiments, the grid is a uniform grid. However, as shown in step 320 of workflow 300, a uniform grid is not required for other embodiments. Rather, the resolution of the grid may be varied based on the varying resolution or the spatial locations of the points of the point cloud. In some embodiments, the resolution of the grid is based on one or more optical limitations of the photon transmitter and the photon receiver employed to generate the point cloud.

At block 524, a linear operator is generated. The linear operator may be a differential operator. For instance, the linear operator may be the 1D, 2D, or 3D Laplace or Laplacian operator ($\nabla^2$). The operator may be generated for each node of the grid.

At block 526, a vector field is generated for the space that includes the point cloud. The vector field may be based on the point cloud. For instance, in some embodiments, the vector field includes $\vec{n}$, where $\vec{n}$ is the vector field that includes a set of normal vectors generated by the point cloud. Step 310 of workflow 300 shows one such exemplary embodiment of a vector field that is generated based on the point cloud. A vector quantity may be generated for each node in the grid. Note that the amplitude of the vector quantity associated with some nodes may be zero. For examples, nodes where no points of the point cloud are in close proximity may include a zero-valued vector quantity.

At block 528, a scalar field is generated for the space that includes the point cloud. The scalar field may be based on the vector field generated at block 526. In at least one embodiment, the scalar field is the divergence of the vector field ($\nabla \cdot \vec{n}$). Step 330 of workflow 300 shows a scalar field over the 2D space. A scalar value or quantity may be determined at each node of the grid, based on the vector quantities associated with the nodes.

At block 530, an RLS is generated over the space that includes the point cloud. The RLS is iteratively updated until one or more convergence conditions is satisfied. Updating the RLS may be based on the linear operator and the scalar field. Various embodiments of generating and updating the RLS are discussed in conjunction of process 600 of FIG. 6. Process 520 terminates and/or returns a calling process upon convergence of the RLS.

Figure 6:
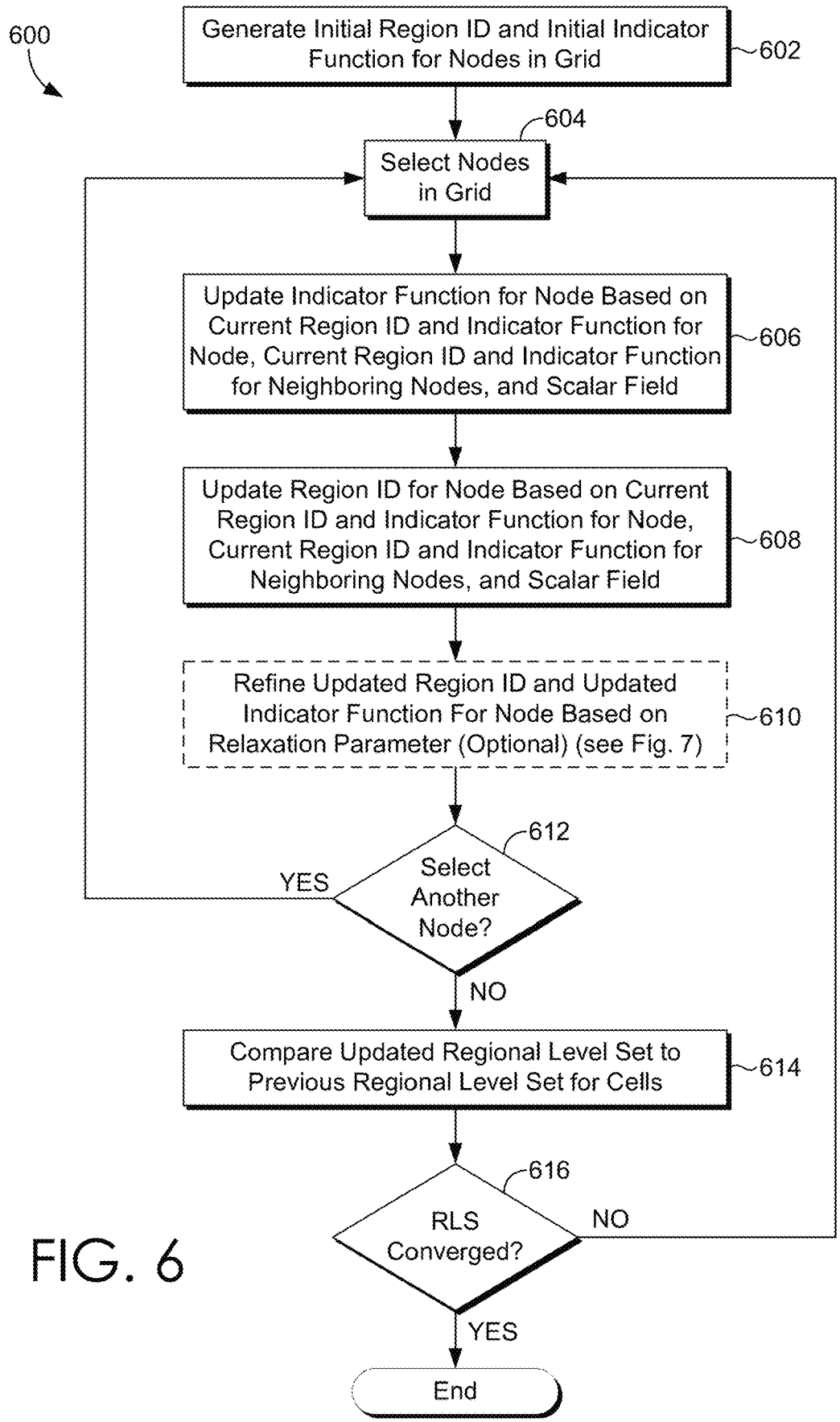
FIG. 6 illustrates one embodiment of a process flow for generating and iteratively updating a regional level set that is consistent with the various embodiments presented herein.

FIG. 6 illustrates one embodiment of a process flow for generating and iteratively updating a regional level set (RLS) that is consistent with the various embodiments presented herein. Process 600 begins, after a start block, at block 602 where an initial estimation for the region ID ($r^0$) and an initial estimation for the indicator function ($\psi^0$) value or quantity for each node in the grid is generated. The initial estimation for r and $\psi$ may be based on the point cloud, the linear operator ($\nabla^2$), the generated vector field ($\vec{n}$) the generated scalar field ($\nabla \cdot \vec{n}$), or the like.

In various embodiments, the initial estimation or approximation of the RLS may include a single region. That is to say, each node may have a common value for the region ID portion of the 2-tuple. For such narrow band embodiments, during process 600, additional regions are generated around the point cloud. Regions subdivide, segment, and/or merge, via process 600, until convergence and/or stabilization is achieved.

At block 604, a node of the grid is selected. For instance, the i-th node may be selected. The node index i may be associated with the number of iterations around the nested (or inner) loop of process 600 that occurs between block 604 and decision block 612. For the following discussion, the region ID and the indicator function value for the selected i-th node may be referenced as $r_i$ and $\psi_i$, respectively. At block 606, the current value for the indicator function of the selected i-th node is updated. At block 608, the current region ID for the selected i-th node is updated.

For the following discussion, during the n-th iteration around the outer loop of process 600 (occurring between block 604 and decision block 616) the current region ID and the current indicator function value for the selected i-th node may be referenced as $r_i^n$ and $\psi_i^n$, respectively. Likewise, the updated region ID and the updated indicator function value for the selected i-th node may be referenced as $r_i^{n+1}$ and $\psi_i^{n+1}$. Thus, the index n may be associated with the number of iterations around the outer loop of process 600.

At blocks 606 and 608, each of the region ID and the indicator function value for the selected i-th node may be updated based on the current region ID ($r_i^n$) and the current indicator function value ($\psi_i^n$). Furthermore, each of the region ID and the indicator function value may be updated based on the current region ID and the current indication function value for the nodes that are in the neighborhood of the i-th node. In some embodiments, N(i) is the subset of nodes that are in the neighborhood of the selected i-th node and |N(i)| is the "size" of the neighborhood. Thus, N(i) and |N(i)| are based on the dimensionality of the space and the point cloud. For instance, in the 1D space, except for nodes near the boundaries of the space, the i-th node has two neighbors. For instance, the nodes indexed as i−1 and i+1 may be in the neighborhood of the i-th node. Thus, for a 1D grid, |N(i)|=2. Similarly, for a 2D grid, |N(i)|=4 and for a 3D grid, |N(i)|=6. In various embodiments, when the PDE being solved for is Equation (1), Equations (2), (3), and (4) may be employed to update the current indicator function value for the selected i-th node. Likewise, equations (2) and (5) may be employed to update the current region ID for the selected i-th node.

At optional block 610, at least one of the updated region ID or the updated indicator function value may be refined based on a relaxation parameter. Various embodiments for refining $r_i^{n+1}$ and $\psi_i^{n+1}$ are discussed in conjunction with at least process 700 of FIG. 7. However, briefly, at block 610, $\psi_i^{n+1}$ may be refined be based on a blend of $\psi_i^{n+1}$ and $\psi_i^n$ to based on a relaxation parameter ($\alpha$). $r_i^{n+1}$ may be refined based on a and a random number. Refining $r_i^{n+1}$ and $\psi_i^{n+1}$ at block 610 may be employed to avoid conditions where neighboring nodes are periodically swapping or oscillating region IDs during the iterations of process 600. For instance, because equation (5) is based only on the region IDs of neighboring nodes, neighboring nodes can swap regions each iteration of the outer loop of process 600 causing the one or more convergence tests to not be satisfied within a finite number of iterations. Refining $r_i^{n+1}$ and $\psi_i^{n+1}$ at block 610 may enable convergence for such embodiments.

At decision block 612, it is determined if another node is to be selected for updating. For instance, at block 612 it may be determined whether to select the next node in the grid, which may be indexed as i+1. If another node is to be updated, the nested or inner loop of process 600 returns to block 604 to select another node, e.g. the next node in the grid for updating. In some embodiments, the i-index may be incremented when returning to block 604 from decision block 612, e.g. i→i+1. If all the nodes of the grid have been updated for the n-th iteration around the outer loop of process 600, process 600 flows to block 614.

It should be noted that in at least some embodiments, updating the region ID and the indicator functions value of each of the nodes via blocks 606 and 608 may be performed by one or more matrix operations. For instance, a matrix representing a system of linear equations, for the grid nodes, may be generated. The PDE to be solved, such as but not limited to Equation (1) may be used to generate a Jacobi matrix for the grid. Thus, the n-th iteration around the outer loop of process 600 may include the matrix operations associated with iteratively updating a vector including the region IDs of the grid nodes ($\vec{r^n} = \{r_1^n, r_2^n, r_2^n, \ldots, r_i^n, \ldots\}$) and a vector including the indicator function values for the grid nodes ($\vec{\varphi^n} = \{\varphi_1^n, \phi, \varphi_2^n, \ldots, \varphi_i^n, \ldots\}$) based on the Jacobi matrix and an associated vector of the scalar field values of the nodes. Thus, the inverse of the Jacobi matrix may be employed to iteratively solve the system of PDEs for the grid nodes.

At block 614, for at least a portion of the grid nodes, the updated RLS ($\{r_i^{n+1}, \psi_i^{n+1}\}$) is compared to the previous values of the RLS ($\{r_i^n, \psi_i^n\}$). At decision block 616, it is determined whether one or more convergence tests or conditions are satisfied based on the comparisons of block 614. If adequate convergence of the RLS has not yet occurred, process 600 returns to block 604 to perform another iteration of the outer loop of process 600. When returning to block 604 from decision block 616, via the outer loop, the index of the outer loop is incremented and the index of the inner loop may be reset, i.e. n→n+1 and i→1. Otherwise, if the RLS has converged, process 600 terminates and/or returns a calling process.

Figure 7:
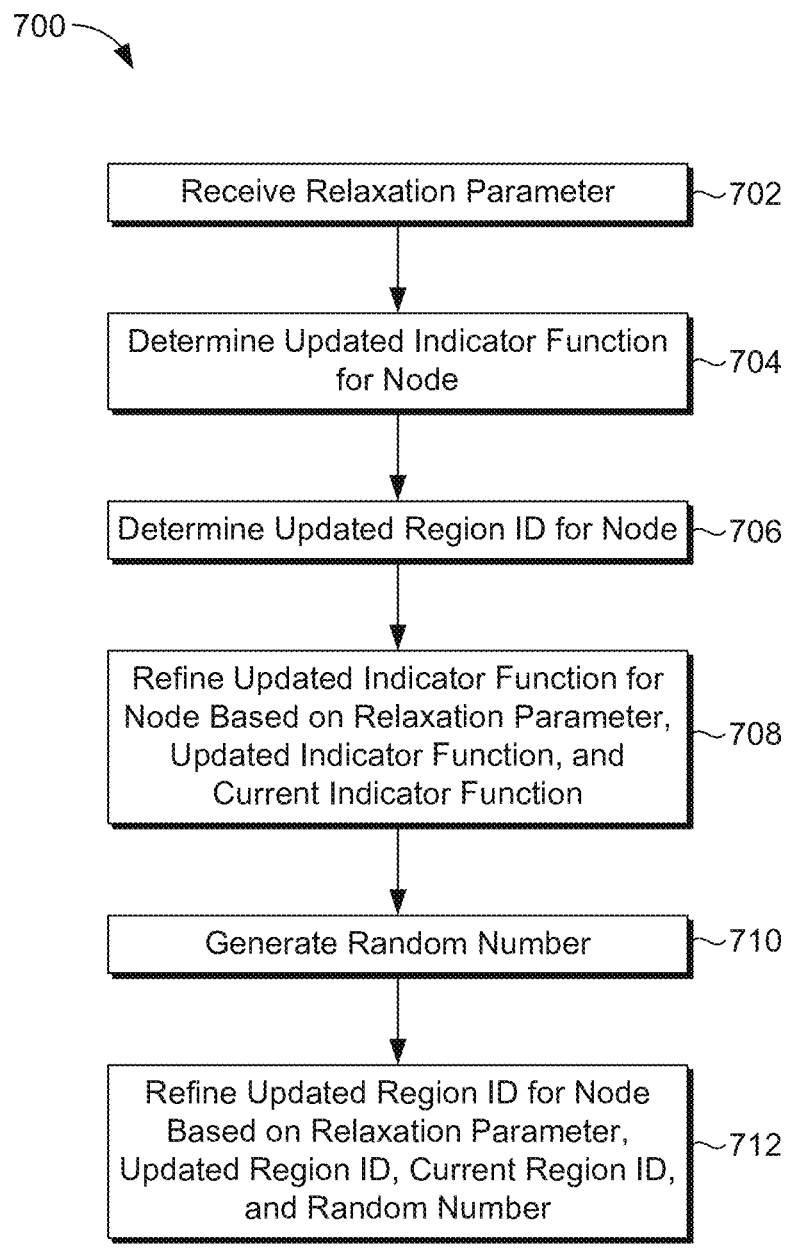
FIG. 7 illustrates one embodiment of a process flow for refining regions of a regional level set that is consistent with the various embodiments presented herein.

FIG. 7 illustrates one embodiment of a process flow for refining regions of an RLS that is consistent with the various embodiments presented herein.

Refining the RLS, via optional process 700, may avoid conditions where neighboring nodes are periodically swapping or oscillating region IDs during the iterative determining of the RLS. For instance, because during each iteration, determining the region ID for a particular node is based only on the region IDs of neighboring nodes, neighboring nodes can swap regions during each iteration, causing the one or more convergence tests of process 600 to not be satisfied within a finite number of iterations. Employing process 700 may enable convergence for such embodiments.

Process 700 begins, after a start block, at block 702 where a relaxation parameter ($\alpha$) is received and $\alpha \in [0, 1]$. A user may provide a. In other embodiments, a is predetermined and/or optimized to enable convergence of the RLS within an acceptable number of iterations around the outer loop of process 600. In at least one embodiment, a $\alpha \approx 0.9$.

At block 704, an updated value for the indicator function value ($\psi_i^{n+1}$) of a selected node is determined. Various embodiments for determining $\psi_i^{n+1}$ are discussed in conjunction with block 606 of process 600 of FIG. 6. In at least one embodiment, equations (2), (3), and (4) (or similar equations) may be employed to determine $\psi_i^{n+1}$. As noted throughout, equations (2), (3), and (4) may be generalized to 2D and 3D in other embodiments. Furthermore, equations (2), (3), and (4) may be varied to solve PDEs other than Equation (1) (Poisson's equation).

At block 706, an updated value for the region ID ($r_i^{n+1}$) of the selected node is determined. Various embodiments for determining $r_i^{n+1}$ are discussed in conjunction with block 608 of process 600. In at least one embodiment, equations (2) and (5) (or similar equations) may be employed to determine $r_i^{n+1}$.

At block 708, the updated indicator function value is refined. $\psi_i^{n+1}$ may be refined based on the relaxation parameter, the updated indicator function value, and the current (or non-updated) indicator function value ($\psi_i^n$). In at least one embodiment, the refined indicator function value for the node may be a blend of the updated and the non-updated indicator function value based on the relaxation parameter. In at least one embodiment, the value of $\psi_i^{n+1}$ may be refined via equation (6).

At block 710, a random (or pseudo-random) number ($\mu$) is generated, where $\mu \in [0,1]$. At block 712, $r_i^{n+1}$ is refined for the selected node based on at least one of $\mu$, $r_i^{n+1}$, $r_i^n$, and a. In at least one embodiment, $r_i^{n+1}$ is refined based on equation (7). Accordingly, based on the relative values of $\mu$ and $\alpha$, $r_i^{n+1}$ may revert back to the non-updated value $r_i^n$. Such embodiments inhibit the continual swapping of region IDs of neighboring grides while iteratively updating the RLS, via process 600. Process 700 terminates and/or returns a calling process.

In some embodiments, additional regional refinement is performed by employing additional PDEs. Such additional region refinement includes enlarger the larger regions and shrinking the smaller regions, while conserving the boundaries determined around the point cloud during the iterative determination of the RLS. Various methods may be employed to refine the regions in this way. For instance, the larger regions may be "pushed" out to encroach on the smaller regions, resulting in the smaller regions be "shrunk." At least a portion of the smaller regions disappear in favor of the larger regions.

Such pushing and shrinking pushing operations may be based on a comparison of the relative sizes of the plurality of regions. In some embodiments, the pushing/shrinking operations are performed at the nodes in proximity to the determined boundaries. A separate height field ($\psi_h$) is iteratively updated at each iteration of process 600. At each node, $\psi_h$ corresponds to the distance from the boundary of the associated region. Thus, the maximum value of $\psi_h$ corresponds to an area of the regions. Thus, the iterative updating of $\psi_h$ enables the comparison of the region sizes for the refinement operations.

Figure 8A:
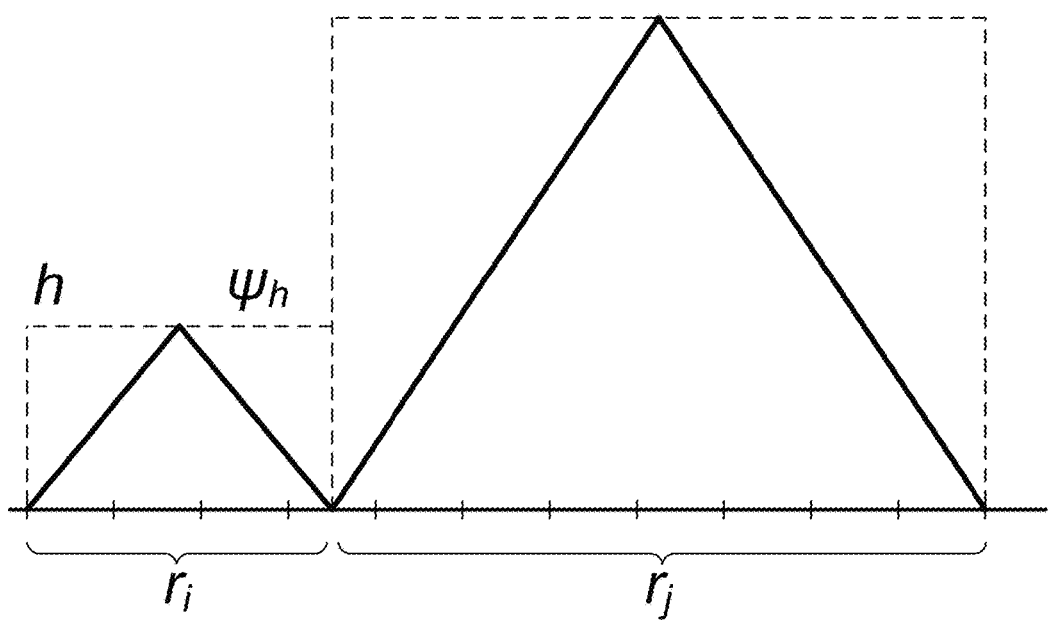
FIG. 8A shows a height field for two neighboring regions in a Regional Level Set that are employed to refine the regions of the Regional Level Set.
Figure 8B:
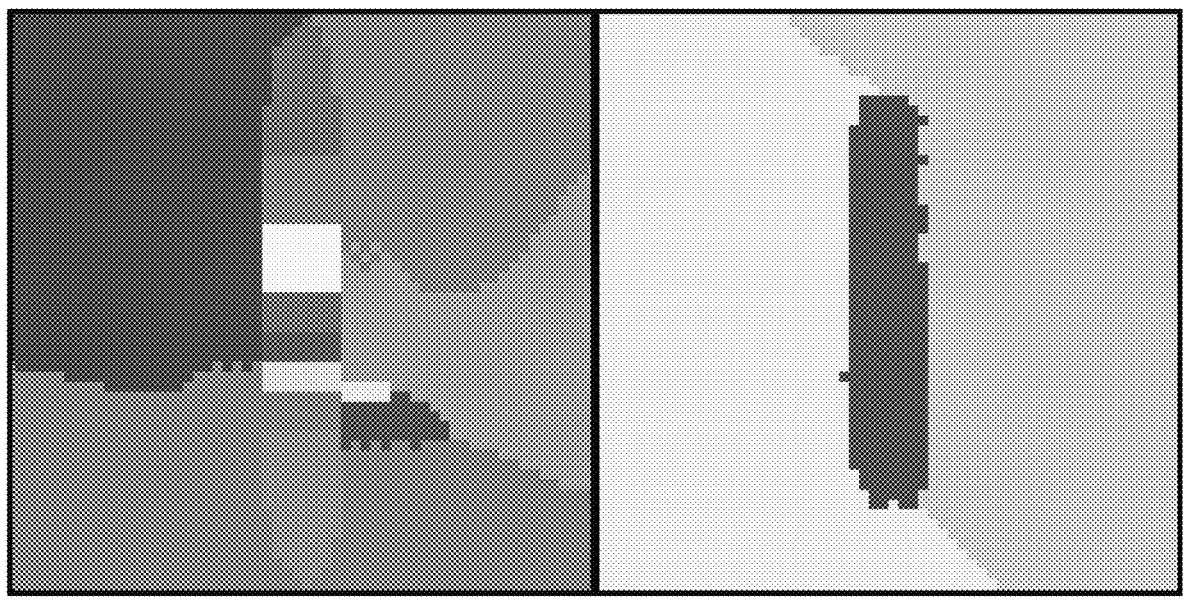
FIG. 8B shows the regions of a Regional Level Set without refinement via the height field of FIG. 8A and the regions refined via the height field of FIG. 8A.

FIG. 8A shows a height field for two neighboring regions in RLS that are employed to refine the regions of the RLS. FIG. 8B shows the regions of an RLS without refinement via the height field of FIG. 8A and the regions refined via the height field if FIG. 8A. The plot on the left shows the plurality of regions without refinement via pushing and shrinking operations. The plot on the right shows the refined plurality of regions via such pushing and shrinking operations.

Illustrative Computing Device

Figure 9:
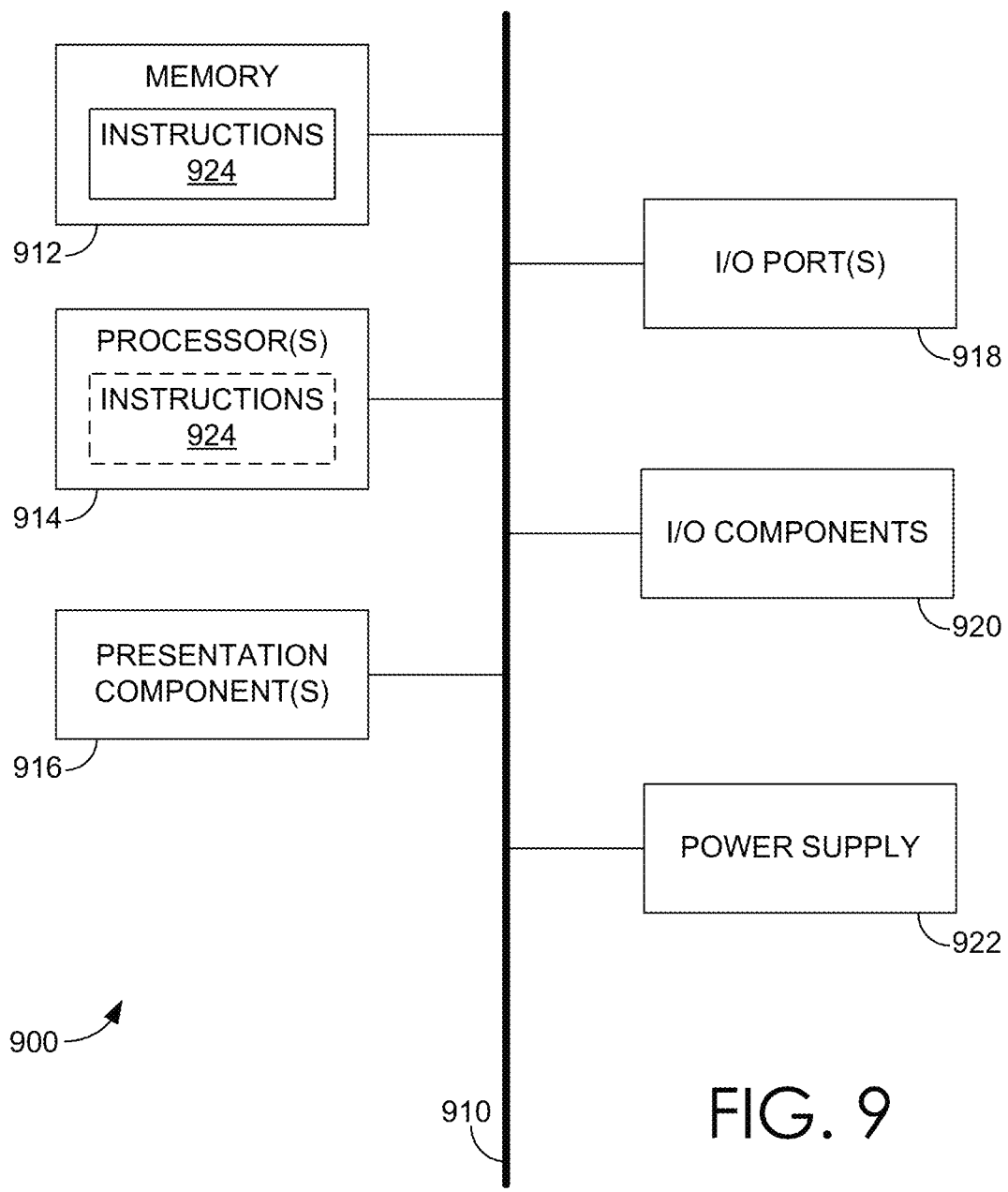
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-readable storage medium having instructions stored thereon, which, when executed by a processor of a computing device cause the computing device to perform actions comprising:
    detecting a plurality of photons that are reflected from a surface of an object, wherein the object is located within a space;
    accessing a point cloud that is based on the detected plurality of photons;
    iteratively generating, based on the point cloud, a model of the object that includes a regional level set (RLS), wherein the RLS includes an iteratively updated region identification (ID) and a corresponding iteratively updated indicator value for each of a plurality of spatial coordinates of the space; and
    employing the model to cause display of a visual representation of the object.

2. The computer-readable storage medium of claim 1, wherein each of a plurality of points included in the point cloud corresponds to one of the detected plurality of photons.

3. The computer-readable storage medium of claim 1, wherein the model of the object segments the space into a plurality of nodes, each node of the plurality of nodes corresponds to one of a plurality of discretized regions of the space.

4. The computer-readable storage medium of claim 3, wherein the actions further comprise:
for each of the plurality of nodes, iteratively updating the indicator value based on indicator values and regions IDs of neighboring nodes; and
for each of the plurality of nodes, iteratively updating the region ID based on the updated indicator values and the regions IDs of neighboring nodes.

5. The computer-readable storage medium of claim 3, wherein the actions further comprise:
refining an updated indicator value for a first node of the plurality of nodes segmented by the node of the object based on a current indicator value for the first node, the updated indicator value for the first node, and a relaxation parameter; and
refining an updated region ID for the first node based on a current region ID for the first node, the updated region ID for the first node, the relaxation parameter, and a pseudo-random number.

6. The computer-readable storage medium of claim 3, wherein the actions further comprise:
generating a new region to include in a plurality of discretized regions of the space segmented by the model of the object when the indicator value for one of the plurality of nodes is less than a region threshold.

7. The computer-readable storage medium of claim 1, wherein the actions further comprise:
generating a vector field in the space based on a plurality of data structures, the plurality of data structures generated based on the detected plurality of photons;
generating a scalar field in the space based on the vector field;
generating a linear operator; and
iteratively updating the model of the object until one or more convergence conditions are satisfied.

8. A method for reconstructing a surface of an object, the method comprising:
steps for generating, based on a detection of a plurality of photons, a point cloud;
steps for generating, based on the generated point cloud, an object model that includes a regional level set (RLS), wherein the RLS includes an iteratively updated region identification (ID) and a corresponding iteratively updated indicator value for each of a plurality of spatial coordinates of a space;
steps for reconstructing, based on the object model, a surface of the object; and
steps for displaying a visual representation of the reconstruction of the object.

9. The method of claim 8, wherein each of a plurality of points included in the point cloud corresponds to one of the detected plurality of photons.

10. The method of claim 8, wherein the object model segments the space into a plurality of nodes, each node of the plurality of nodes corresponds to one of a plurality of discretized regions of the space.

11. The method of claim 8 further comprising:
steps for generating a vector field in the space based on a plurality of data structures, the plurality of data structures generated based on the detected plurality of photons;
steps for generating a scalar field in the space based on the vector field;
steps for generating a linear operator; and
steps for iteratively updating the object model until one or more convergence conditions are satisfied.

12. The method of claim 8 further comprising:
steps for refining an updated indicator value for a particular node of a plurality of nodes based on a current indicator value for the particular node, the updated indicator value for the particular node, and a relaxation parameter; and
steps for refining an updated region ID for the particular node based on a current region ID for the particular node, the updated region ID for the particular node, the relaxation parameter, and a pseudo-random number.

13. The method of claim 8 further comprising:
steps for generating a new region to include in the plurality of discretized regions of the space segmented by the object model when the indicator value for one of a plurality of nodes is less than a region threshold.

14. A computing system comprising:
a processor device; and
a non-transitory computer-readable storage medium, coupled with the processor device, having instructions stored thereon, which, when executed by the processor device, provide the system with one or more engines configured for reconstructing a surface of an object by performing actions comprising:
detecting a plurality of photons that are reflected from the surface of the object;
accessing a point cloud that is based on the detected plurality of photons;
iteratively generating, based on the point cloud, a model of the object that includes a regional level set (RLS), wherein the RLS includes an iteratively updated region identification (ID) and a corresponding iteratively updated indicator value for each of a plurality of spatial coordinates of a space; and
employing the model to cause display of a visual representation of the object.

15. The computing system of claim 14, wherein the actions further comprise:
generating, based on the detected plurality of photons, a plurality of data structures, wherein each data structure of the plurality of data structures corresponds to a location on the surface of the object.

16. The computing system of claim 15, wherein the model of the object segments the space of the plurality of data structures into a plurality of regions, wherein the space is discretized via a plurality of nodes.

17. The computing system of claim 16, wherein the actions further comprise:
for each of the plurality of nodes, iteratively updating the indicator value based on indicator values and regions IDs of neighboring nodes; and
for each of the plurality of nodes, iteratively updating the region ID based on the indicator values and the regions IDs of neighboring nodes.

18. The computing system of claim 16, wherein the actions further comprise:
generating a vector field in the space based on the plurality of data structures;
generating a scalar field in the space based on the vector field;
generating a linear operator; and
iteratively updating the object model until one or more convergence conditions are satisfied.

19. The computing system of claim 16, wherein the actions further comprise:
  refining an updated indicator value for a first node of the plurality of nodes based on a current indicator value for the first node, the updated indicator value for the first node, and a relaxation parameter; and
  refining an updated region ID for the first node based on a current region ID for the first node, the updated region ID for the first node, the relaxation parameter, and a pseudo-random number.

20. The computing system of claim 16, wherein the actions further comprise:
  generating a new region to include in the plurality of regions of the space segmented by the model of the object when the indicator value for one of the plurality of nodes is less than a region threshold.

* * * * *